(12) United States Patent
Elias et al.

(10) Patent No.: US 7,883,222 B2
(45) Date of Patent: Feb. 8, 2011

(54) LENS HOOD FOR A CAMERA

(75) Inventors: James Elias, Munich (DE); Peter Giegerich, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 819 days.

(21) Appl. No.: 11/749,740

(22) Filed: May 16, 2007

(65) Prior Publication Data

US 2007/0268588 A1    Nov. 22, 2007

(30) Foreign Application Priority Data

May 18, 2006    (DE) .................. 20 2006 008 370 U

(51) Int. Cl.
*G02B 23/16* (2006.01)

(52) U.S. Cl. .................. 359/611; 396/534; 396/544; 353/97

(58) Field of Classification Search .................. 359/611, 359/612; D16/237
See application file for complete search history.

(56) References Cited

U.S. PATENT DOCUMENTS

| 3,589,260 | A | * | 6/1971 | Ferra .......................... 396/419 |
| 4,441,794 | A | * | 4/1984 | Field .......................... 359/611 |
| 4,687,312 | A |   | 8/1987 | Navarro |
| 5,347,432 | A | * | 9/1994 | Chiavetta .................... 362/18 |
| 6,597,873 | B2 | * | 7/2003 | Doi ............................ 396/534 |
| 2004/0151492 | A1 | * | 8/2004 | Blok et al. .................. 396/534 |

FOREIGN PATENT DOCUMENTS

DE    35 23 039 A1    1/1986
DE    20 2005 004 068 U1    7/2005

OTHER PUBLICATIONS

Partial English translation of DE 20 2005 004 068 previously filed in an IDS dated May 16, 2007.

* cited by examiner

*Primary Examiner*—Lee Fineman
(74) *Attorney, Agent, or Firm*—Christie, Parker & Hale, LLP

(57) ABSTRACT

A lens hood for a camera, includes a sun shade projecting in front of the camera lens and/or at least one hood wing which can pivot about a vertical or horizontal pivot axis. Included is a three-dimensional structure with a basket-like holder for the sun shade and a fastening means, which defines the vertical or horizontal pivot axis and can pivot, for the hood wing.

13 Claims, 3 Drawing Sheets

LENS HOOD FOR A CAMERA

CROSS-REFERENCE TO RELATED APPLICATION

This application claims priority of German Application Number 20 2006 008 370.7, filed on May 18, 2006.

DESCRIPTION

A lens hood for a film or video camera is known from DE 20 2005 004 068 U, is linked directly to the camera lens or is arranged at the front end of a matte box which is linked to a film camera or a camera lens, according to DE 35 23 039 A1. In the matte box for a film camera known from 35 23 039, a front frame, which has a lens hood mounted in it, is supported by iris rods such that it can slide and pivot, which iris rods extend parallel to the camera lens from the film camera. A light-shielding module encompassing the housing of the camera lens forms the camera-side closure of the matte box and prevents diffuse light from entering the imaging beam path of the film camera.

The lens hood known from DE 20 2005 004 068 U comprises a sun shade, which is linked to filter holder modules and has a rectangular or obelisk-like profile with an opaque structure, and hood wings fastened to the front edge of the sun shade. The hood wings are hinged on the front edge of the sun shade such that they can pivot, and as a result their arrangement and thus the aperture size of the lens hood can be selected as relevant to the position of extraneous light sources. Upper and lower hood wings are hinged about horizontal pivot axes at the upper and lower edge of the sun shade such that they can pivot, while the lateral hood wings can pivot about vertical pivot axes.

FIGS. 4 and 5 show, from different perspective views, a lens hood according to the prior art, which lens hood comprises a sun shade 2' with a frame 4' (facing the front face of a camera lens) for linking to filter holder modules fastened to the camera lens or matte box, and a circumferential front edge 5' to which, via hinge joints 9', two lateral hood wings 31', 33' capable of pivoting about a vertical pivot axis and an upper hood wing 32' capable of pivoting about a horizontal pivot axis are fastened. The sun shade 2' is formed as a circumferential, obelisk-like shell which must be designed such that it is sufficiently rigid to hold the hood wings 31', 32', 33' and mechanically robust enough to transmit load between the circumferential front edge 5' and the rear frame 4'.

For weight and cost reasons, the sun shade 2' is made from an opaque plastic; as such, it is particularly vulnerable to the effects of impacts, which could lead to deformation or destruction of the sun shade. In practice, an impact load from the lower face (without hood wing) of the sun shade represents a further load on the sun shade 2', for example if a camera linked to this lens hood is placed onto the ground or other surface such that part of the camera weight bears on the sun shade in addition.

One object of the present invention is to create a lens hood of the type mentioned in the introduction. This lens hood is, on account of protection of the sun shade and secure fastening of the hood wings, as far as possible resistant to mechanical stresses; it can be employed as desired with sun shade, hood wings or both in combination; and it allows for secure placement of a camera linked to the lens hood.

The solution according to the invention provides a sun shade, which is as far as possible resistant to mechanical stresses, can be used in conjunction with a sun shade and/or hood wings, protects the sun shade from damage, permits secure fastening of the hood wings and allows for secure placement of the camera onto a flat surface without risk of damage to the sun shade or hood wings.

Use of a three-dimensional surrounding structure results in those forces acting on the lens hood, when the hood wings are adjusted or when a camera fitted with the lens hood is set down, not being transmitted to and via the sun shade, but absorbed by the three-dimensional structure and transmitted to the camera lens or matte box mount. Separation of the mechanical load capacity of the lens hood from its optical function permits the selection of respectively optimal materials for mechanical load capacity on one hand, and for the optical function of the lens hood on the other.

Furthermore, the three-dimensional structure allows for lens hood assemblies utilizing the sun shade alone, utilizing one or more hood wings or utilizing a combination of a sun shade with one or more hood wings, and thus permits variable use for example in conjunction with wide-angle lenses, zoom lenses and the like.

Moreover, the mechanical strength of the lens hood is increased by more secure fastenings of the hood wings to the structure and by the integration of the pivot axes for pivoting the hood wings in the three-dimensional structure. At the same time, the ability of the hood wings to pivot and lock at a set angle position is ensured by using stable rotary joints.

The solution according to the invention is based on the idea of providing a three-dimensional structure as the load-bearing support element for the lens hood such that the sun shade and the hood wing(s) must only perform their light-shielding functions. As such the sun shade and hood wings need not be made more rigid than inherently necessary for the fulfillment of these light-shielding functions. This allows a wider choice of material for the sun shade and the hood wing(s) in order to optimize the light-shielding function and minimize the weight of the lens hood.

Integration of the horizontal and vertical pivot axes in the three-dimensional structure avoids the necessity for complicated and therefore expensive rotary bearings in the hood wings, thus ensuring, overall, that an inexpensive lens hood is produced.

The profile of the three-dimensional structure is preferably matched to the external profile of the sun shade and, in particular, the sun shade is surrounded by the structure.

This embodiment of the invention ensures that the sun shade is protected along its entire circumference, that is to say on all sides by the three-dimensional structure, whereas, in the case of lens hoods according to the prior art, the sun shade does not have such protection and can therefore easily be damaged.

In one preferred embodiment, the three-dimensional stand has an obelisk-like profile with open rectangular base areas on parallel planes, whose open small base area facing the camera lens is surrounded by a frame, and whose open large base area is surrounded by crosspieces, which are supported such that they can pivot, for holding the hood wings.

The cross-sectionally trapezoid structure of the lens hood is matched to the viewing angle of a camera lens and permits the linking of the invented lens hood to camera lenses of any desired focal length, and, if linked to wide-angle lenses, use of the lens hood, without sun shade, but with a variable number of hood wings is also possible.

The execution of the small base area facing the camera lens as a frame permits linking the lens hood as desired with filter holders, connecting the lens hood via a fastening element directly to a camera lens or matte box and allows for provision of any desired suitable fastening holders for the sun shade.

In one preferred embodiment of the invention, the three-dimensional structure is in the form of a mechanically stable cage.

The construction of the three-dimensional structure as a mechanically stable cage allows for avoidance of parts from the solid. It thus permits lightweight execution and simple production via punching, deep drawing and/or thermoforming of the three-dimensional structure itself.

In a further embodiment of the invention, struts project away from the frame at an angle corresponding to the obelisk-like profile of the stand, at the ends of which rotary joints are arranged for linking crosspieces to the struts such that they can pivot, the struts being composed in particular of stamped sections incorporating flanges at angles, on which one section of the rotary joints is fastened, their other section being arranged on the crosspieces for holding the hood wings.

This execution of the side parts of the three-dimensional structure creates a dimensionally stable cage having both the necessary load-bearing structure and allowing for lightweight design, while offering optimal options for fastening the sun shade and pivoting the hood wings.

In order to increase the strength of the flanges for holding the pivot bearings for the hood wings, corner reinforcements are provided in a further embodiment of the invention between the struts that adjoin a given corner.

Screw connections or fastening holders in the form of clamp elements or snap-action mechanisms are used to connect the sun shade to the three-dimensional structure.

The arrangement of screw bolts on at least one crosspiece, which form contact points on the outer profile of the structure, allow for secure rest positioning and reliable protection of the sun shade, as connected to the three-dimensional structure, when the structure is put down in contact with a rest surface.

In a further embodiment, the screw bolts can be used for linking the hood wings to the crosspieces and have a bolt head composed of a mechanically stable, elastic or plastic material, ensuring that the lens hood can be placed safely and in an optimal fashion on a flat surface, while keeping the volume at a minimum.

One advantageous development of the invention is characterized in that the structure has connecting means for linking the structure to a filter holder, matte box, camera lens or to support rods, these linked in turn to a housing of the camera.

In principle, the three-dimensional structure can be composed of any desired material as long as its mechanical stability is ensured either by the manufacturing process or by the selected material. This requirement can be met as examples either by a material of low strength, which is provided with corresponding pleats or struts or executed in sandwich construction, or by a material of high strength, in particular a metallic material.

The concept and further features and advantages of the invention will be explained in more detail with reference to embodiments illustrated in the drawings, in which.

Figure 1:
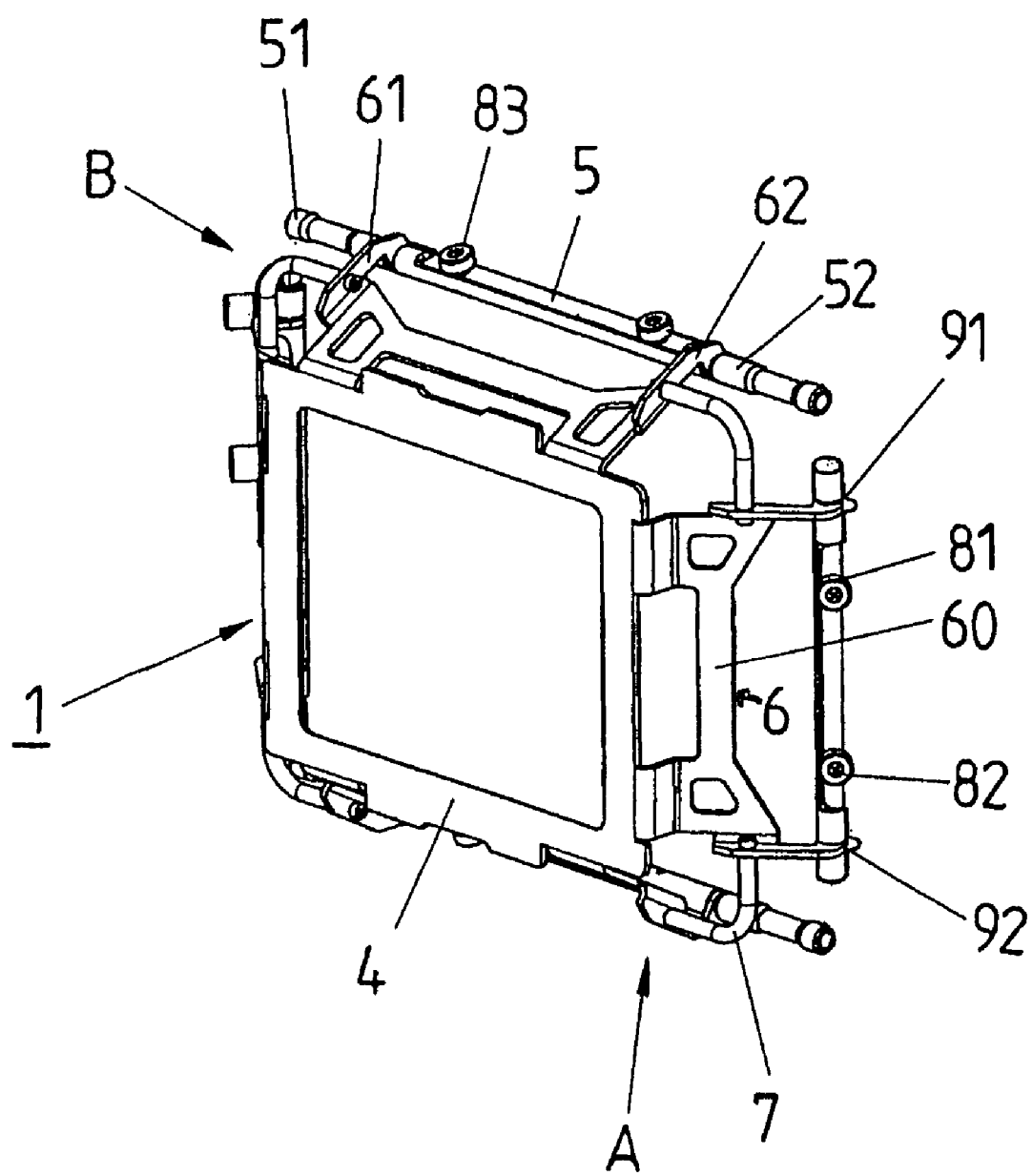
FIG. 1 shows a perspective illustration of a three-dimensional structure for a lens hood.

FIG. 1 shows a perspective illustration of a three-dimensional structure 1 for a lens hood directly linked, or linked via filter holder modules, to a camera lens or a matte box, which is fastened to iris rods linked to the camera housing. The lens hood extends in front of the front face of the camera lens and is intended for blocking stray light falling on the front face of the camera lens, or for producing special masking effects.

The three-dimensional structure 1 used as a base element of the lens hood has a rectangular frame 4 forming the small base area A of an obelisk-like structure of the three-dimensional structure 1. The rectangular frame 4 is arranged adjacent to the front face of a camera lens and can be linked to filter holder modules for color filters or special-effect filters. Struts 6 extend on all sides from the rectangular frame 4 at right angles or at obtuse angles, and are linked to crosspieces 5 at their ends, which are opposite their frame 4, for holding hood wings.

The struts 6 are composed of stamped sections 60 and flanges 61, 62, which are spaced apart from each other and bent away from the stamped sections 60. Rotary joints 91, 92 for the crosspieces 5 are fastened to the flanges 61, 62 and comprise, by way of example, intermeshing conical faces which are arranged on the one hand on the flanges 61, 62 and on the other hand on the crosspieces 5. Clamp elements 51, 52, which act steplessly or clamp at discrete angle settings are used to fix the crosspieces 5, which are rotated with respect to the flanges 61, 62 and the struts 6. In turn, the hood wings linked to the crosspieces 5 and to the rotary joints 91, 92, can be fixed in position respectively.

Corner reinforcements 7 link the flanges 61, 62 of the struts 6 which adjoin the same corner, in order to increase the total strength of the struts 6 with respect to one another. The corner reinforcements are also used as additional protective elements for the sun shade as linked to the three-dimensional structure.

The crosspieces 5 have flats between the rotary joints 91, 92, on which hood wings can be fastened by means of screw bolts 81, 82, with the screw bolts simultaneously acting as spacers or base feet for setting down the lens hood, in which case each of the side edges of the three-dimensional structure can be used as a base.

Figure 2:
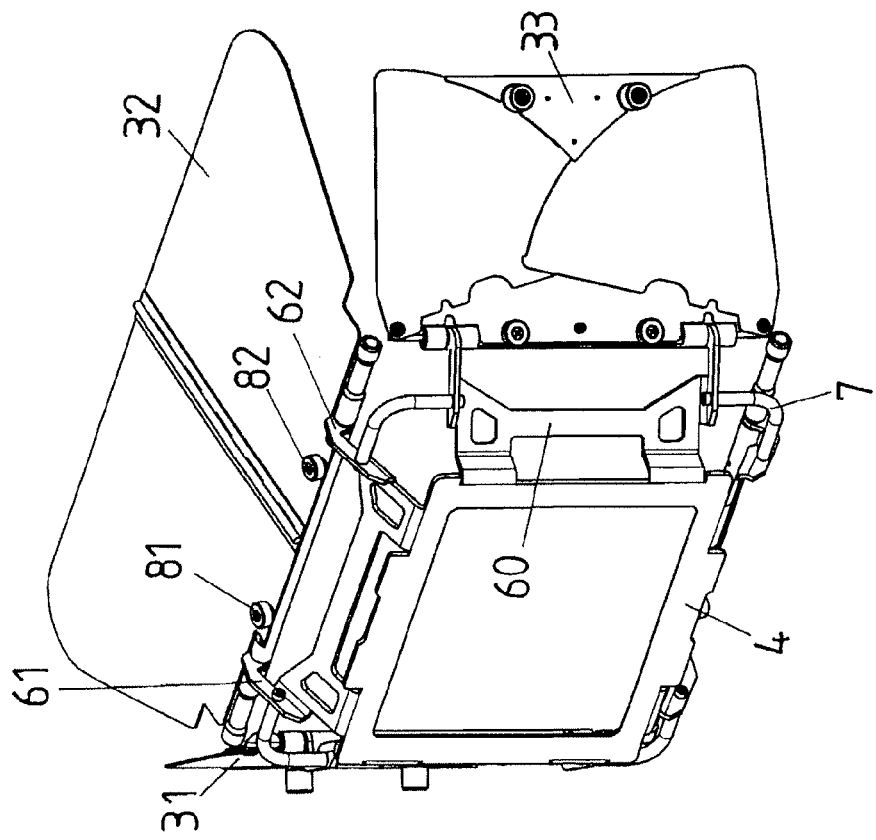
FIG. 2 shows a perspective view of a lens hood with three hood wings arranged on the three-dimensional structure such that they can pivot.
Figure 5:
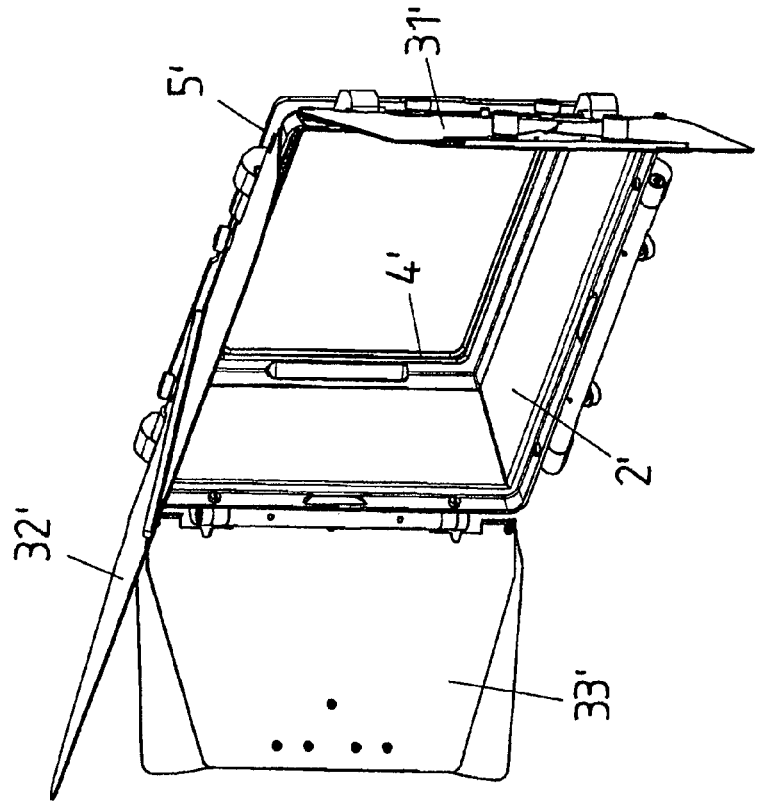
FIGS. 4 and 5 show a lens hood of prior art design in various perspective views.
Figure 4:
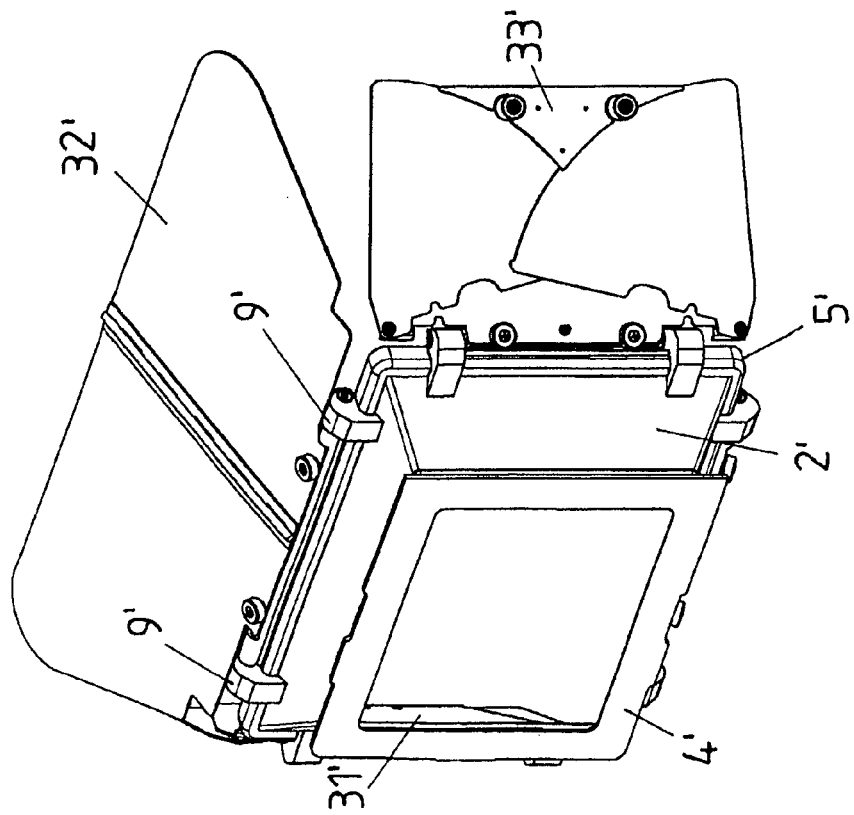

FIG. 2 shows the three-dimensional structure 1 of the lens hood with hood wings 31, 32, 33 fastened to the lateral crosspieces and the upper crosspiece, but without a sun shade linked to the three-dimensional structure 1. An embodiment of the lens hood of this type can be provided, for example, in conjunction with the use of wide-angle lenses on the camera.

The lateral hood wings 31, 33 can pivot about the lateral crosspieces 5 (forming vertical pivot axes) of the three-dimensional structure 1, while the upper hood wing 32 can pivot about the upper crosspiece 5 (forming a horizontal pivot axis). In addition, a lower hood wing 32 (not shown) can be linked to the structure 1 such that it can pivot about the lower crosspiece 5 (likewise forming a horizontal pivot axis).

The hood wings 31, 32, 33, which are composed of an opaque flexible plastic-panel material or of aluminum or steel sheet, can be fixed in any pivot position by friction or detent by means of the clamp elements 51, 52, with the result that the camera lens can be appropriately shielded relevant to stray light falling from the front.

The upper (and, optionally lower) hood wing 32 has a trapezoid outline, whose short base side is linked to the upper crosspiece 5. The two lateral hood wings 31, 33 likewise have trapezoid outlines, the longer base side, however, being fastened to the associated crosspieces 5 of stand 1, with the result that corresponding tilting of the upper and, optionally, lower hood wing toward the optical axis is possible. The two lateral hood wings 31, 33 are composed of mounting panels to which lateral hood-wing segments are adjustably hinged such that, depending on the angle position of the upper hood wing 32 and the lateral hood wings 31, 32, light-stopping closure is ensured at the adjoining corner regions of the hood wings 31, 32, 33.

The design and operation of the lateral hood wings 31, 33 may, for example, correspond to DE 20 2005 004 068 U.

Figure 3:
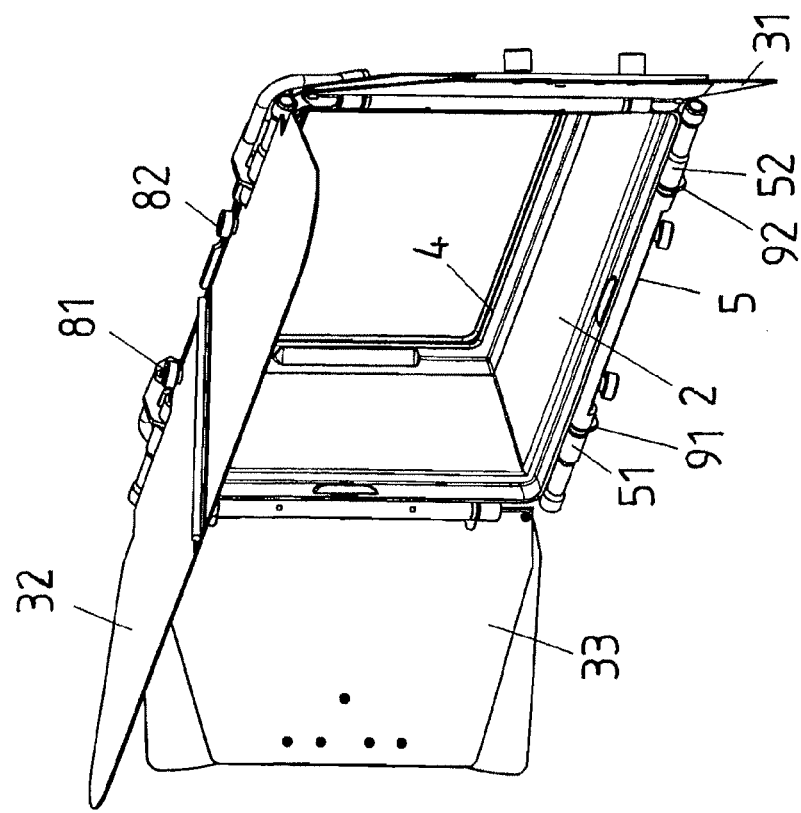
FIG. 3 shows a perspective illustration of a lens hood with hood wings arranged on a three-dimensional structure and a sun shade.

FIG. 3 shows a perspective illustration of the lens hood according to FIG. 2 from the opposite side with sun shade 2 inserted into the three-dimensional structure 1.

The sun shade 2 is fastened to the surrounding rectangular frame 4 and/or the struts 6 using screw fasteners or clamping mechanisms. In the former, the sun shade 2 can be fastened to the surrounding rectangular frame 4 via either screw-nut-arrangements with through holes in the surrounding rectangular frame 4 and corresponding holes in the sun shade 2, or via screws screwed into threads in the rectangular frame 4. With clamping mechanisms, the sun shade is inserted into clamping holders in the rectangular frame 4.

As is evident from the perspective illustration in FIG. 3, the sun shade 2 is located within the cage-like three-dimensional structure 1 and is thus protected by the three-dimensional structure 1 on all sides, with corner reinforcements forming a protective border, in particular for the corner region of the sun shade, whose corner region is vulnerable to effects from impacts.

The hood wings 31, 32, 33 are linked to the flattened region of the crosspieces 5 between the rotary joints 91, 92 by means of the screw bolts 81, 82. The screw bolts 81, 82 are designed and arranged such that they can be used not only to fasten the hood wings 31, 32, 33, but also as supporting feet when the lens hood linked to a camera lens is placed on a flat surface in a manner in which the camera base or a holding panel linked to the camera forms one contact point and the screw bolts 81, 82 form the other contact point. For this reason, the screw bolts 81, 82 have a cylindrical bolt head 83 composed of a mechanically stable, elastic or plastic material, ensuring a good and soft contact when setting the camera down.

LIST OF REFERENCE SYMBOLS

1 three-dimensional stand
2 sun shade
4 rectangular frame
5 strut
6 molding
7 corner connector
31, 32, 33 hood wings
51, 52 clamp elements
61, 62 flanges
81, 82 screw bolts
83 cylindrical bolt head
91, 92 rotary joints
A small base area
B large base area

The invention claimed is:

1. A lens hood for a camera comprising hood wings which can pivot about a vertical or horizontal pivot axis, a base element having a three-dimensional structure with a basket-like profile, comprising:
   a rectangular frame;
   struts extending on all sides from the rectangular frame;
   rotary joints linked to ends of said struts; and
   crosspieces connected to said rotary joints,
      said hood wings being connected to said crosspieces, which define a vertical and horizontal pivot axis for said hood wings,
      said lens hood further comprising a sun shade for projecting forward of the camera lens, said sun shade being located within said base element and fastened to said rectangular frame and said struts.

2. The lens hood of claim 1, wherein said base element has an obelisk-like three-dimensional structure and wherein an external profile of said sun shade matches to said obelisk-like structure of said base element.

3. The lens hood of claim 2, wherein the obelisk-like profile of said base element comprises open rectangular small and large base areas on parallel planes, wherein the open small base area faces the camera lens and is surrounded by said rectangular frame and wherein the open large base area is surrounded by said crosspieces.

4. The lens hood of claim 3, wherein said struts project away from the frame at an angle corresponding to the obelisk-like profile of the base element.

5. The lens hood of claim 4, wherein said struts comprise stand sections linked to the frame and flanges bent at an angle to the stand sections, wherein said rotary joints are fastened to said flanges.

6. The lens hood of claim 5, wherein adjacent flanges are linked to each other via corner reinforcements.

7. The lens hood of claim 6, wherein the sun shade is fastened to the frame and the struts by means of clamp elements or by means of a snap-action mechanism.

8. The lens hood of claim 1, wherein screw bolts form contact points of said base element when said base element is set down, said screw bolts are arranged on at least one of said crosspieces.

9. The lens hood of claim 8, wherein said hood wings are linked to said crosspieces by means of screw bolts.

10. The lens hood of claim 9, wherein each screw bolt has a cylindrical bolt head.

11. The lens hood of claim 10, wherein each cylindrical bolt head comprises a mechanically stable, elastic or plastic material.

12. The lens hood of claim 1, wherein said base element has connecting means for linking said base element to a filter holder, matte box, camera lens or to support rods linked to a housing of the camera.

13. The lens hood of claim 1, wherein the three-dimensional structure comprises a metallic material.

\* \* \* \* \*